United States Patent Office 3,513,990
Patented May 26, 1970

3,513,990
APPARATUS FOR MAGNETICALLY UNLOADING ARTICLES FROM HANDLING RACKS
Donald L. Wolfe, Reading, Pa., assignor to Western Electric Company, Incorporated, New York, N.Y., a corporation of New York
Filed July 12, 1968, Ser. No. 744,573
Int. Cl. B65g 59/06, 57/00; B65b 69/00
U.S. Cl. 214—6                                 5 Claims

ABSTRACT OF THE DISCLOSURE

A plurality of handling racks, each having a plurality of elongated, paramagnetic articles transversely supported thereon, are stacked in a feeding canister and are withdrawn individually and transported through a magnetic field having horizontal lines of force. The elongated, paramagnetic articles are attracted from the handling racks and supported along the horizontal lines of force after which the articles are removed in a scoop. The empty handling racks are moved away from the magnetic field and are restacked in a receiving canister.

BACKGROUND OF THE INVENTION

(1) Field of the invention

This invention relates to and apparatus for magnetically unloading articles from handling racks, and more particularly, to and apparatus for magnetically attracting a plurality of elongated, paramagnetic articles which are moved past a magnetic field and then supporting the articles in the field in an oriented manner for subsequent removal therefrom.

(2) Description of the prior art

In the manufacture of articles having elongated, paramagnetic components, e.g., diodes, the components may at some stage of the manufacture be supported in notched handling racks for specific manufacturing operations. After these particular operations, the elongated, paramagnetic articles must be transferred from the elongated handling racks into a scoop, after which an operator moves the scoop to reposition the diodes for a subsequent operation.

Problems arise when the operator attempts to transfer these elongated, paramagnetic diodes from the handling racks to the scoop, while maintaining the diodes oriented with respect to one another. In the past, one method has been to transfer manually the diodes from the handling racks to the scoop. Needless to say, this operation is time consuming and wasteful and imposes severe limitations on manufacturing capacity. In another method, the handling racks may be inverted over the scoop to drop the diodes into the scoop. However, this method presents problems in that the diodes will not fall in oriented manner into the scoop and will be positioned randomly in the scoop with time consumed in rearranging the diodes for the subsequent operations.

SUMMARY OF THE INVENTION

It is therefore an object of this invention to provide new and improved apparatus for magnetically unloading a succession of handling racks to transfer successive groups of paramagnetic articles from the handling racks to a scoop.

Moreover, it is also an object of this invention to withdraw successively handling racks supporting groups of paramagnetic articles and transporting the handling racks through a magnetic field to unload the handling racks and suspend the articles along the lines of force for subsequent removal from the magnetic field in a scoop.

With these and other objects in mind, the present invention contemplates apparatus for moving groups of elongated, paramagnetic articles into and through a magnetic field where the elongated articles are attracted and suspended along magnetic, parallel lines of force for subsequent removal in an oriented manner.

More particularly, the present invention includes a plurality of handling racks, each supporting a plurality of elongated, paramagnetic articles which are arranged in a stack from which successive handling racks are withdrawn. The handling racks are moved in seriatim from a feeding canister into and through a magnetic field having parallel lines of force. The elongated, paramagnetic articles are attracted from the handling racks and are suspended along the lines of force, after which an operator passes a scoop through the field and removes a mass of the articles in oriented manner in the scoop. The empty handling racks are then conveyed from the magnetic field to a loading canister where each successive handling rack is elevated over a pair of spaced retaining pawls which hold the successive racks in engagement with each other to restack the handling racks.

DETAILED DESCRIPTION

Figure 1:
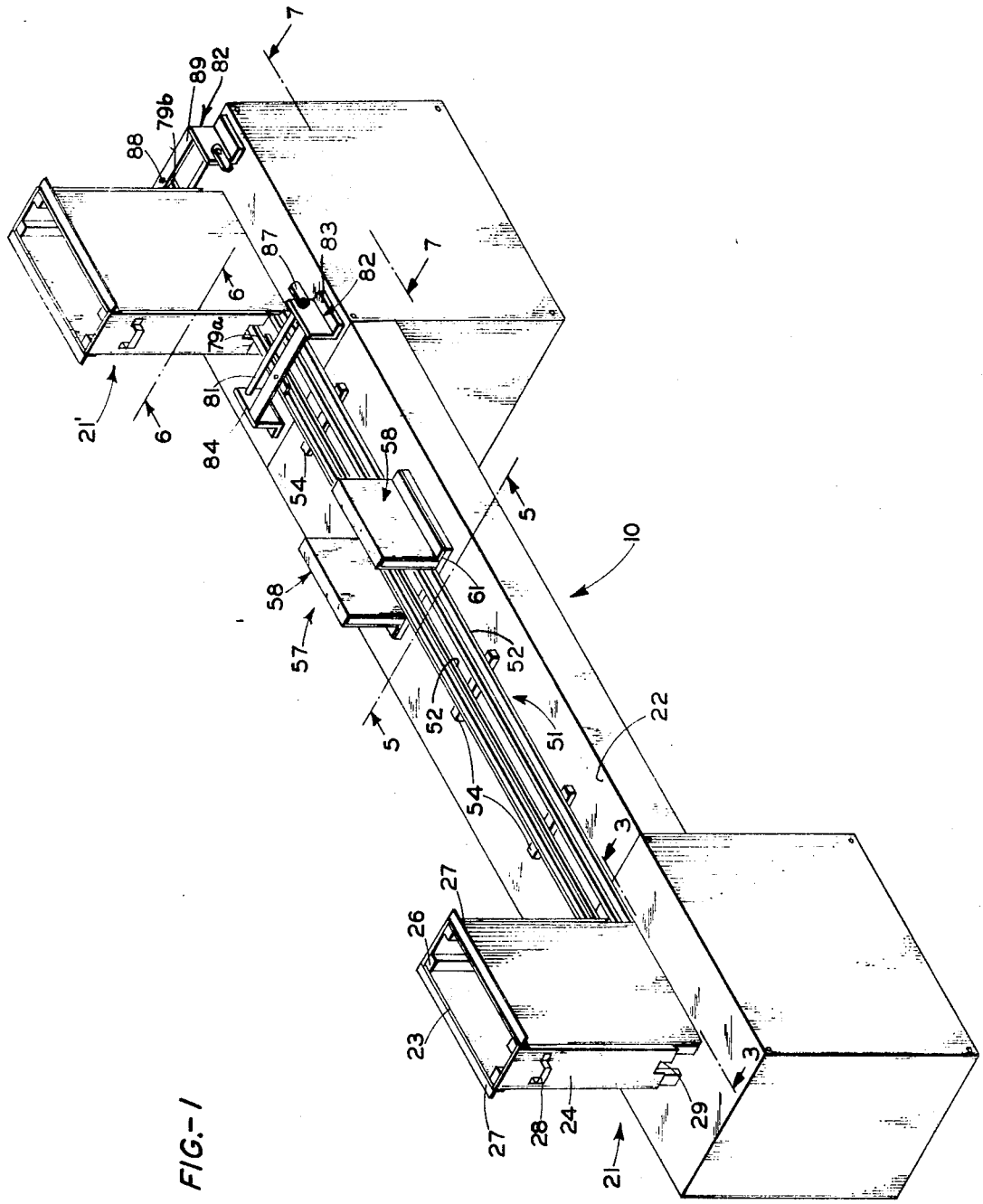
FIG. 1 is a perspective view showing an apparatus for moving successive ones of a stack of handling racks through a magnetic field where the articles are attracted out of the racks and suspended in the magnetic field.

Referring now to FIG. 1, there is shown an apparatus 10 embodying the principles of the present invention and which includes a feeding canister 21 into which a plurality of handling racks or carriers 14 (see FIG. 2) are stacked and then withdrawn individually and moved along a trackway 51 through a magnetic field having horizontal lines of force between a pair of spaced side walls 58. As the racks 14 are moved through the magnetic field, elongated, paramagnetic articles 11, which are supported in parallel relationship in the racks, are attracted from the racks and suspended with the longitudinal axes of the articles along the lines of force. The empty racks 14 are advanced away from the magnetic field and into a receiving canister 21' which is identical to the feeding canister 21 and are restacked therein.

Figure 2:
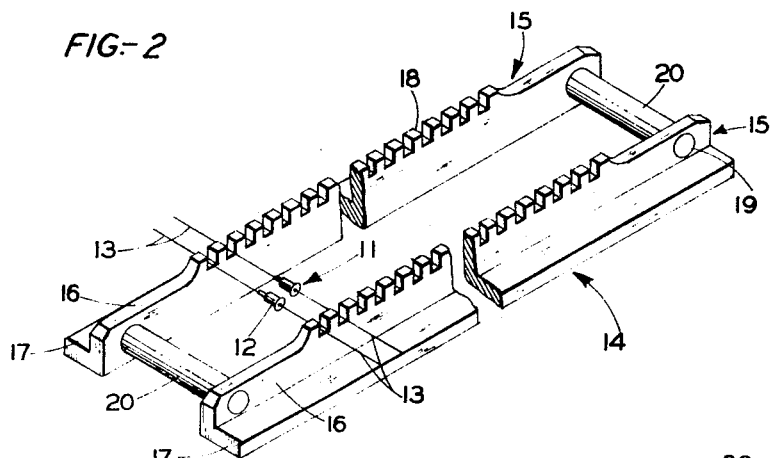
FIG. 2 is a perspective view of a handling rack for supporting a plurality of elongated, paramagnetic articles in a spaced relation.

In the manufacture of elongated, paramagnetic articles, e.g., diodes, 11, having a body portion 12 and coaxial leads 13, it is required that the diodes be supported in parallel, spaced relationship in a handling rack, designated generally by the numeral 14 (see FIG. 2). The handling racks are made up of a nonmagnetic material, such as aluminum, and have a pair of parallel, spaced side angle bars 15, having an upright leg 16 and a horizontal leg 17. In each of the upright legs 16 of the spaced side bars 15 are formed opposite and aligned notches 18. A group of the diodes 11 are supported in the handling rack 14 with the leads 13 received in the notches 18. The side bars 15 are held spaced apart a distance greater than the length of the body portion 12 of the articles 11 by a pin 19 at each end of the rack 14 with a sleeve 20 received over the pin and abutting the inside, vertical surfaces of each of the side bars 15.

Figure 3:
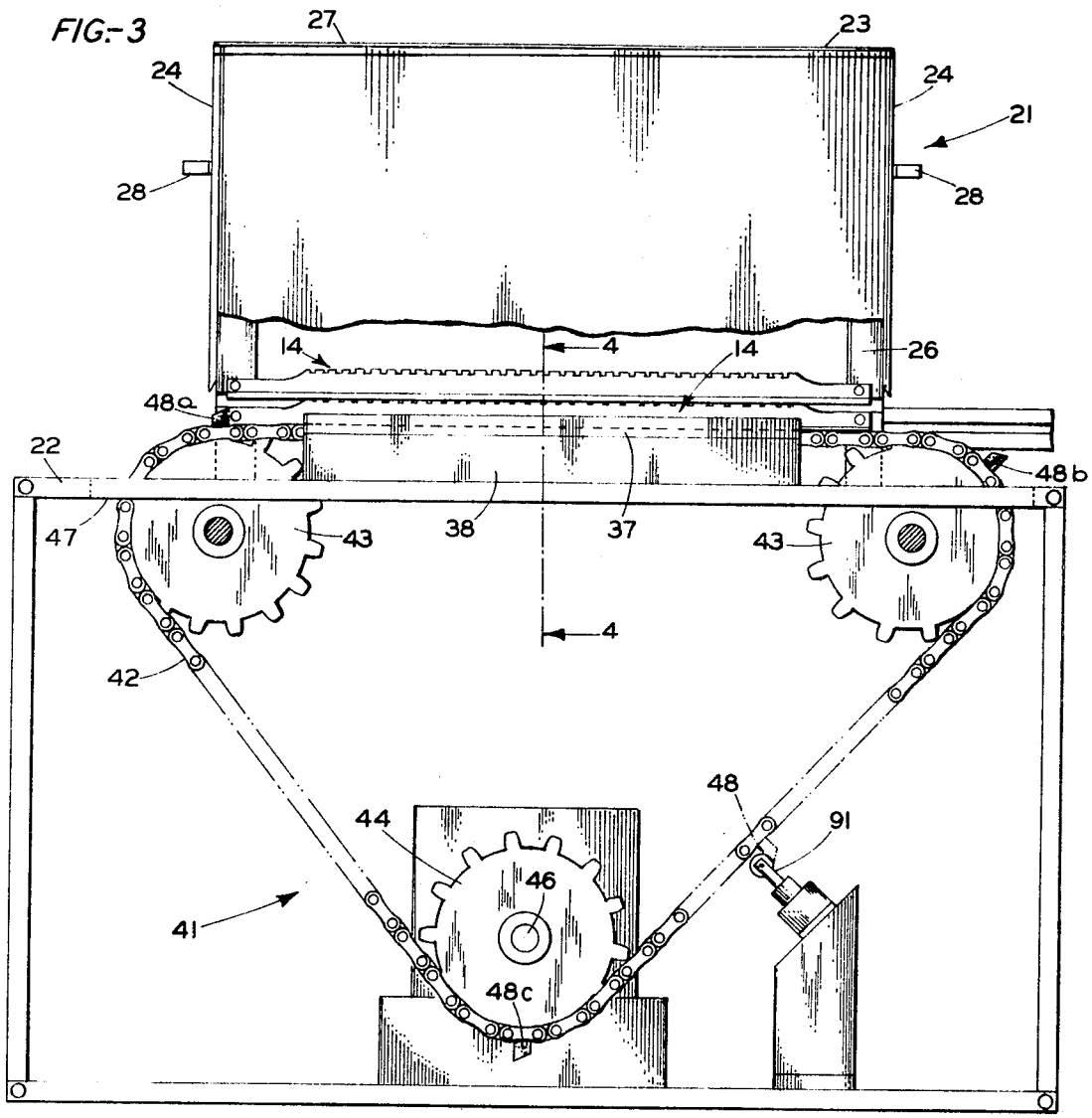
FIG. 3 is a side elevational view of the apparatus shown in FIG. 1 taken along lines 3—3 and showing a feeding canister and a conveyer for withdrawing the racks successively and individually from the feeding canister.

As shown in FIG. 3, a plurality of the handling racks 14 are arranged in a stack in a feeding canister 21 which is supported on a base plate 22. The feeding canister 21 is constructed of vertical side plates 23 and front and rear plates 24 which are fastened to column bars 26 (see also FIG. 1). An angle brace 27 is attached to the top of each of the side plates 23 to strengthen the side plates. In order for an operator to conveniently transfer the feeding canister 21 from a supply to the apparatus 10, a lifting bar 28 is attached to each of the end plates 24 at approximately the mid-height thereof.

The end plates 24 of the feeding canister 21 are formed to permit the egress of the handling racks 14 which are received therein. Accordingly, the end plate 24 is shorter than the side plates 23 (see FIG. 1) and has a slotted opening 29 cut therein. Moreover, the column bars 26 extend into the canister 21 only to the lower edge of the end plates 24 (see FIG. 6). However, the side plates 23 extend below the end plates 24 and are attached to base blocks 31. It should also be observed from FIG. 6 that the lowermost edges of the plates 24 are spaced above the base blocks 31 and form a passageway 32 to permit movement of the elongated articles therebetween.

Figure 6:
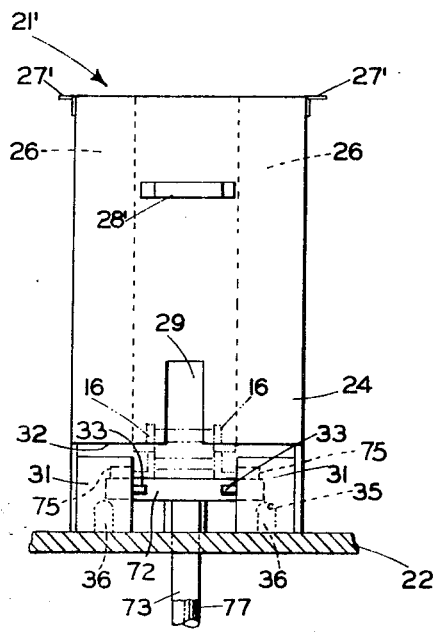
FIG. 6 is an end, elevational view, taken along lines 6—6 in FIG. 1 of a receiving canister for receiving emptied handling racks and in which the handling racks are restacked for subsequent use.

In order to hold the handling racks 14 for withdrawal from the feeding canister 21, the base blocks 31 are spaced apart a distance only slightly greater than the spacing between the side bars 15 of the handling racks (see FIG. 6). Moreover, a pair of posts 33 project laterally from the base blocks 31 at each end of the support blocks. The lowermost handling rack 14 in the stack of handling racks in the feeding canister rests on the posts 33 so that an operator may transfer a feeding canister full of loaded racks onto the base plate 22 with the racks supported by the posts in the canister.

The operator positions properly the feeding canister 21 on the base plate 22 over a feeding guideway (see FIG. 4), designated generally by the numeral 34 with the assistance of four locator pins 36 projecting up from the base plate. The locator pins 36 are spaced so that each is received in a bore 35 formed in the bottom of each of the base blocks 31. (See FIG. 6.)

Figure 4:
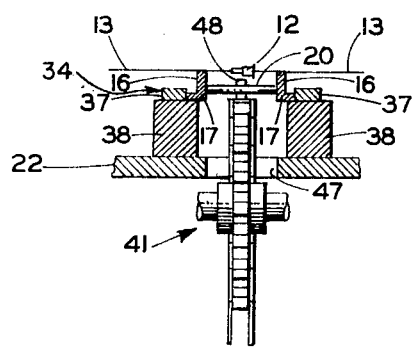
FIG. 4 is an end, elevational view in section, taken along lines 4—4 in FIG. 3 and showing the conveyer in relation to a feeding guideway and the feeding canister.

When the operator places the feeding canister 21 on the base plate 22 over the locator pins 36, the lowermost handling rack is received in the feeding guideway 34 (see FIG. 4). The feeding guideway 34 includes a pair of spaced rails 37 which are mounted on support bars 38 mounted on the base plate 22. Each of the rails 37 is narrower than the supporting bar 38 so that the horizontal leg 17 of the side bar 15 of the handling rack 14 rests on the top surface of one of the bars 38 and is adjacent the vertical inside surface of the rail 37.

The upper surface of the support bars 38 are above the tops of the posts 33 when the canister 21 is placed on the base plate, so that the stack of handling racks 14 is lifted slightly upwardly and off the posts to rest on the support bars 38 of the feeding guideway 34. Moreover, the handling racks 14 are supported on the guideway 34 with the bottom portion of the grooves 18 of the side bars 15 slightly above the tops of the base blocks 31 so that when the elongated, paramagnetic articles are in the racks, the leads 13 extend over the base blocks. The next higher, adjacent rack 14 is positioned with the side angle bars 15 thereof resting on the top surfaces of the upstanding legs 16 of the side bars of the lowermost handling rack in the stack in the feeding canister 21 (see FIG. 3).

When the feeding canister 21 is properly placed on the base plate 22 and over the locator pins 36, the feeding canister is in alignment with the feeding guideway 34 and with an endless conveyor, designated generally by the numeral 41 (see FIGS. 3 and 4).

Referring now to FIG. 3, the conveyor 41 has a continuous chain 42 which is mounted on a pair of spaced sheaves 43 and then around a drive wheel 44. The drive wheel 44 is driven by a commercially available motor (not shown) having a drive shaft 46 (see FIG. 3) and which is mounted below the base plate 22. In order to engage the handling racks 14, the conveyor 41 is mounted so as to protrude through a slot 47 cut in the base plate 22 (see also FIG. 4).

As the conveyor 41 is moved in a clockwise direction, as viewed in FIG. 3, the lowermost handling rack 14 in the feeding canister 21 is withdrawn from the stack of handling racks and moved to the right through the passageway 32 formed between the bottom of the end plate 24 and the base blocks 31 by one of three pawls 48a–48c attached to the endless conveyor 41. One of the pawls 48 engages the left-hand sleeve 20 of the lowermost rack 14 (as viewed in FIG. 3), and moves the rack to the right onto a trackway, designated generally by the numeral 51 (see FIG. 1). As the rearmost part of the rack 14 is moved onto the trackway 51, the pawl 48 is disengaged from the sleeve 20, and is moved on the chain 42 under the base plate 22.

Figure 5:
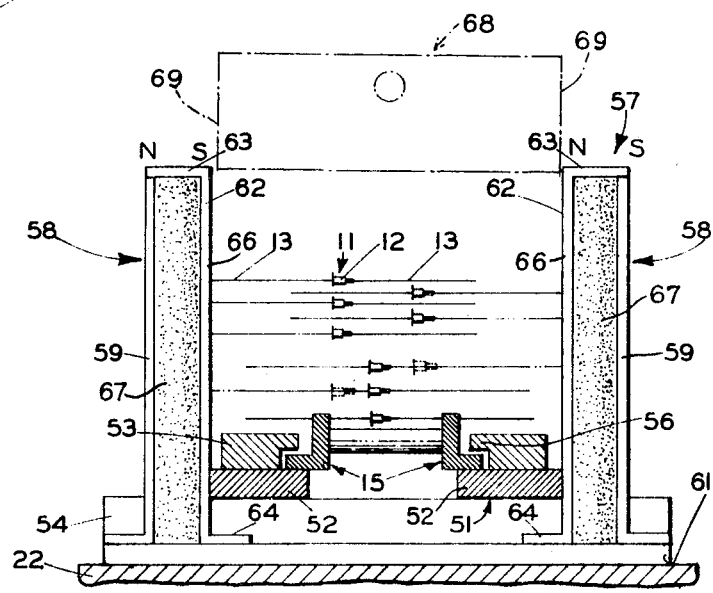
FIG. 5 is an elevational view, partially in section, of a device for establishing the magnetic field and taken along lines 5—5 in FIG. 1.

As can best be seen in FIGS. 1 and 5, the trackway 51 includes a pair of spaced bed bars 52 which is supported by the base plate 22. A guide bar 53 is secured to each of the bed bars 52 and are spaced apart, as shown in FIG. 5, so that the side bars 15 of the racks 14 are supported on the top surfaces of the bed bars 52 and spaced slightly from the guide bars 53. The bed bars 52 are supported on a plurality of ties 54 (see FIG. 1) which are secured to the base plate 22. As shown in FIG. 5, the guide bar 53 may be constructed with an overhang portion 56 which continuously constrains the racks from buckling upwardly out of the trackway as the racks are moved therealong. Alternately, washers (not shown) may be mounted rotatably and intermittently along the trackway 51 on the tops of the guide bars 53 so that the washer overlaps the top surfaces of the bottom leg of the angle side bars 15 to retain the racks 14 in the trackway as the racks are moved therealong.

The handling racks 14, loaded with the diodes 11, are pushed individually and successively in end-to-end relationship along on the trackway 51 toward a magnetic unloading device, designated generally by the numeral 57 (see FIGS. 1 and 5). As shown in FIG. 5, the unloading device 57 includes a pair of spaced-apart side walls, designated generally by the numeral 58, spanning the trackway 51. The side walls 58 include a pair of spaced, vertical plates 59 which are supported on a bottom plate 61. The bottom plate 61 is positioned between the trackway 51 and the base plate 22 and is secured to the base plate (see FIG. 5). Each of the walls 58 is completed with a nonmagnetic, stainless steel member 62 having a Z-shape with a top leg 63 secured to the top of the vertical plate 59 and with a bottom leg 64 extending under the bed bar 52 and secured to the bottom plate 61. A vertical portion 66 of the left-hand stainless steel member 62 is spaced from the right-hand stainless steel member 62 a distance slightly greater than the length of the paramagnetic articles 11.

In order to attract the articles 11 from the racks 14, a plate magnet 67 is positioned in each of the walls 58, as shown in FIG. 5, with the north pole of the right-hand magnet and with south pole of the left-hand magnet facing in toward the trackway 51. Moreover, the positioning of the plate magnet 67 within the walls 58 establishes a magnetic field between the walls which has a greatest flux density above the trackway 51 and with the magnetic field having horizontal lines of force.

As the leading one of the handling racks 14 is moved on the trackway 51 between the walls 58 of the unloading device 57 and under the magnetic field, the elongated, paramagnetic articles 11 are attracted by the horizontal magnetic lines of force between the magnets 67 and are pulled out of the notches 18 in the handling racks. The paramagnetic articles 11 are supported with the longitudinal axes aligned with the horizontal lines of force between the side walls 58 with random ones of the articles in contact with either of the walls (see FIG. 5). The operator may then conveniently move a scoop 68 (see FIG. 5) into the field to remove a mass of the leaded diodes 11. The scoop 68 is dimensioned so that the scoop may be moved between the side walls 58 and has sides 69 which are spaced apart slightly greater than the length of the elongated, paramagnetic articles 11.

As each of the handling racks 14 is unloaded under the unloading device 57, the handling rack is continuously moved further on the trackway 51 into the passageway 32 in a receiving canister 21', which is identical to the feeding canister 21. The leading handling rack 14 is pushed by the next successive rack over an elevating mechanism, designated generally by the numeral 71 (see FIGS. 6 and 7).

Figure 7:
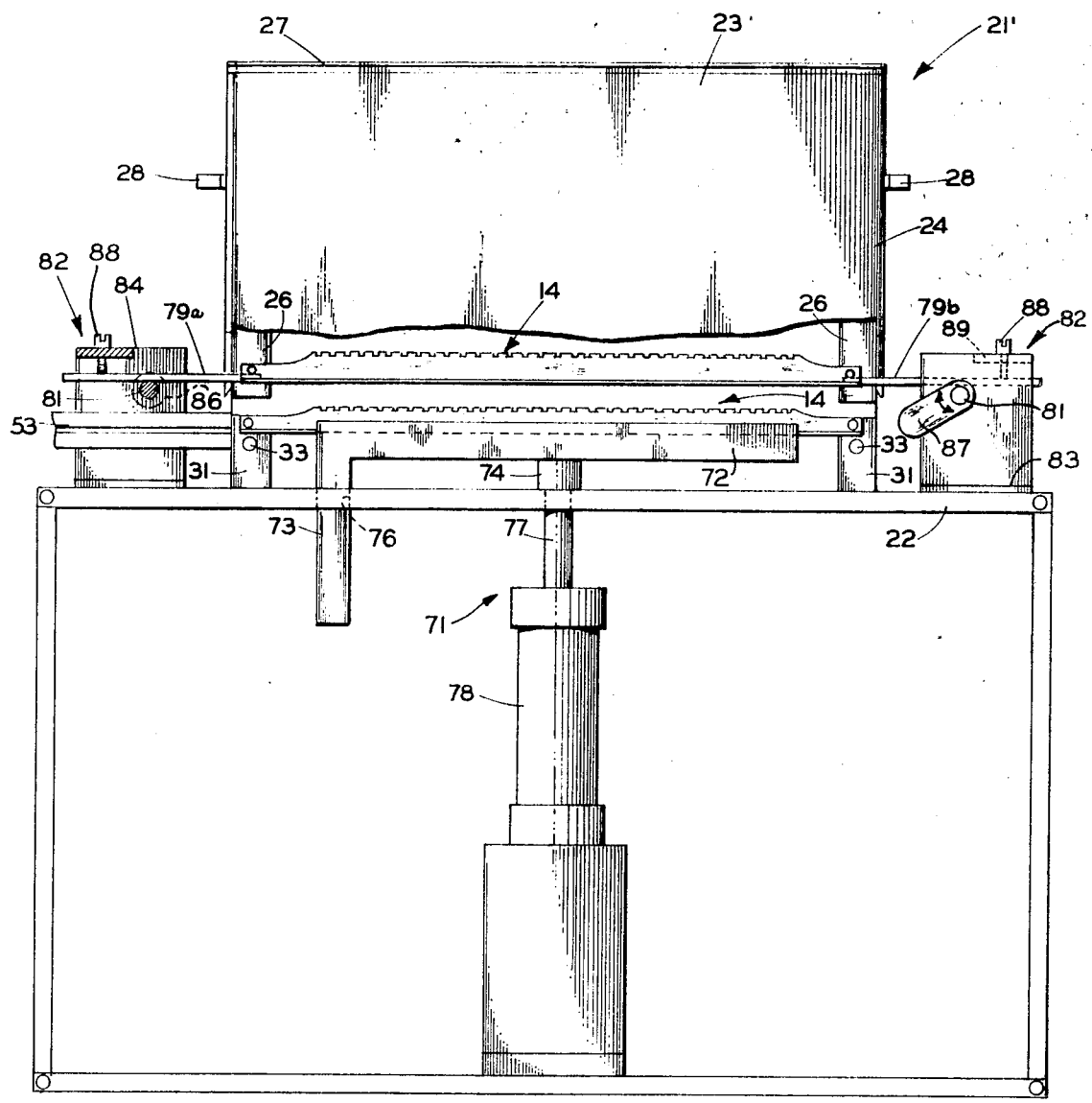
FIG. 7 is a side, elevational view, partially in section, taken along lines 7—7 in FIG. 1, and showing the receiving canister together with a pair of spaced retaining pawls for holding the emptied racks in a stack.

Referring now to FIGS. 6 and 7, the elevating mechanism 71 includes a platform 72 which extends between the sides of the canister 21' and which is supported on a stabilizing bar 73 and a strut 74. The stabilizing bar 73 extends through an opening 76 in the base plate 22. The strut 74 is attached to one end of a piston rod 77 that extends through the base plate 22 to an air-operated cylinder 78. Spaced bars 75 on platform 72 guide racks 14.

As the elevating mechanism 71 lifts each successive handling rack 14 upwardly into the receiving canister 21', the handling rack is retained in the receiving canister 21' by a pair of spaced retaining pawls 79a–79b, each of which extends through the slotted opening 29 in the end plates 24 (see FIGS. 1 and 7). Each of the pawls 79 is mounted on a shaft 81 which is rotatably mounted in a pair of spaced bearing blocks, designated generally by the numeral 82.

The bearing blocks 82 have a lower leg 83 which extends laterally of a vertical stanchion 84 and is secured to the base plate 22. The shaft 81 is held laterally in the bearing blocks 82 by bushings 86 positioned on the shaft outside each of the stanchions 84. A counterweight 87 is secured to one end of the shaft 81 to bias the left-hand pawl 79a in a clockwise direction, as viewed in FIGS. 1 and 7, and the right-hand pawl 79b in a counter-clockwise direction.

The pawls 79 are maintained in a generally horizontal position to hold the handling racks within the receiving canister 67 by an adjusting bolt 88. The adjusting bolt 88 is threadably turned into a bridging bar 89 that spans the end of the trackway 51 transversely and is supported on the bearing blocks 82. An operator may adjust the position of the retaining pawls 79 by turning the adjusting bolt 88. For example, to raise the right end of the left-hand pawl 79a, as viewed in FIG. 7, which protrudes into the receiving canister 21', the operator turns the bolt 88 to move the bolt downwardly. On the other hand, to lower the end of the left pawl 79a, as viewed in FIG. 7, the operator turns the the bolt to move the bolt upwardly.

OPERATION

In operation, the operator places a feeding canister 21, having a stack of handling racks 14 of elongated, paramagnetic articles 11 in each of the racks, on the base plate 22 and over the locator pans 36 to align the feeding canister with the endless conveyer 41 and with the feeding guideway 34. When the feeding canister 21 is resting on the base plate 22, the stack of racks 14 are supported on the feeding guideway 34. As the conveyer 41 is driven to move the chain 42, one of the pawls 48 engages the sleeve 20 of the lowermost rack 14 and pushes the rack to the right and out of the passageway 32 onto the trackway 51.

As successive handling racks 14 are moved onto the trackway 51 and pushed therealong by succeeding racks, the leading handling rack is moved between the side walls 58 of the magnetic unloading device 57. The elongated, paramagnetic articles 11 are attracted by the magnetic field between the magnets 67 and are suspended with the longitudinal axes of the articles along the parallel lines of force which have the greatest flux density in a plane at approximately mid-height of the unloading device 57. Even if the side bars 15 of the racks 16 were made of a magnetizable material, the racks would be retained on the trackway 51 by the overhang 56 on the guide bars 53 as the racks are moved through the magnetic unloading device 57.

After a plurality of the racks 14 have been unloaded in the magnetic field between the walls 58 of the unloading device 57, the operator moves the scoop 68 into the unloading device between the side walls and removes a batch of the articles 11. The articles 11 in the scoop 68 are in parallel relationship with each other with the longitudinal axes of the articles transverse to the sides 69 of the scoop.

The leading handling rack 14 is pushed through and then out of the magnetic field by trailing racks and into the passageway 32 of the receiving or stacking canister 21' and positioned over the platform 72 of the elevating mechanism 71. As the next successive, lowermost rack 14 is moved onto the trackway 51 and the pawl 48 is disengaged therefrom, a second of the three equidistantly spaced pawls 48 engages a limit switch 91 located under the base plate 22 (see FIG. 3). The feeding and receiving canisters 21 and 21' are spaced so that as the lowermost rack 14 is moved onto the trackway 51, the leading rack 14 is positioned over the platform 72 of the elevating mechanism 71 (see FIG. 1). The limit switch 91 completes an electrical circuit (not shown) to actuate the air cylinder 78 to move the rack 14 upwardly within the receiving canister 21' and past the pawls 79. The pawls 79a and 79b are engaged and rotated counterclockwise and clockwise, respectively, with the shafts 81 until the rack 14 is past and above the ends of the pawls. Then the counterweights 87 urge the left-hand pawl 79a to rotate clockwise until stopped by the bolt 88, and the right-hand pawl 79b, as viewed in FIG. 7 to rotate counterclockwise until engaged by the adjusting bolt 88. Then the cylinder 78 is actuated to retract the piston rod 77 and lower the platform 72 out of engagement with the handling rack 14 to receive the next successive leading rack which has been emptied by the magnetic unloading device 57. The rack 14 drops slightly and is supported on the retaining pawls 79a and 79b.

As each successive leading rack 14 is moved into the receiving canister 21' and then lifted upwardly over the retaining pawls 79, a stack of handling racks is formed within the receiving canister. The operator may then conveniently remove the canister 21' with the stack of the handling racks 14 and replace the filled canister with an empty canister. When the operator grasps the lift bars 28 and raises the receiving canister 21' off the base plate 22, the stack of empty racks 14 is supported on the posts 32 projecting from the support blocks 31.

It should be understood that it would be within the scope of this invention to transfer the articles 11 from the feeding canister 21 to the receiving canister 21' on a conveyer belt or chain or other devices which may be commercially available.

Moreover, it should be apparent that it would be within the scope of this invention to employ electromagnets for establishing the magnetic field within the unloading device 57 in place of the permanent plate magnets 67.

It is to be understood that the above-identified embodi-

What is claimed is:

1. In a system for unloading racks of parallel arranged, elongated paramagnetic articles;
    means for feeding said racks, loaded with said articles, individually from a stack of said racks;
    means for establishing a magnetic field having parallel lines of force to attract the articles from the racks and suspend the articles along the lines of force in parallel relationship with each other;
    means receiving the empty racks for rearranging said racks in a stack; and
    means for guiding said racks from said feeding means through said magnetic field to said receiving means.

2. In an apparatus for unloading a mass of elongated, paramagnetic articles from handling racks in oriented relationship to each other;
    means for storing a plurality of said handling racks, each of said racks supporting a group of said articles;
    means for receiving said racks and arranging said racks in a stack after said articles have been unloaded from said racks;
    means for moving said handling racks in seriatim from said storing means to said receiving means; and
    means positioned between said storing means and said receiving means and spanning said moving means for establishing a magnetic field having horizontal lines of force to attract said articles from said racks and suspend said articles along the lines of force to facilitate subsequent removal from the magnetic field.

3. In an apparatus for unloading elongated, paramagnetic articles from handling racks while maintaining the articles in oriented relationship with each other;
    means for holding a stack of said racks;
    means spaced from said holding means for receiving individually each of said racks after said articles have been unloaded therefrom;
    means positioned between said holding means and said receiving means for guiding said racks from said holding means to said receiving means;
    means intermediate said guiding means and spaced apart a distance for establishing magnetic lines of force to attract the articles from the racks and hold said articles along the lines of force as the racks are moved therethrough;
    means for withdrawing successive ones of said racks from said holding means to position said racks in end-to-end relationship on said guiding means and to move said racks therealong; and
    means responsive to each of a leading one of said racks being moved into said receiving means for advancing transversely each rack to form a stack.

4. In an apparatus for loading a plurality of groups of elongated, paramagnetic articles from handling racks into a workholder;
    means for holding a plurality of said racks in a stack;
    conveying means moved into said holding means at one end thereof for engaging a lowermost one of said racks and withdrawing said lowermost one of said racks from said stack;
    a receptacle for receiving said racks after the articles have been unloaded from the racks;
    track means for guiding said racks from said conveying means to said receptacle;
    means spanning said track means intermediate said holding means and said receptacle for establishing a magnetic field having horizontal lines of force and for receiving said workholder;
    an elevating device for receiving a leading one of said racks from said track means and for raising each leading handling rack into said receptacle;
    means responsive to a leading one of said racks moved into said receptacle for actuating said elevating device;
    spaced means in said receptacle for retaining each of said racks which has been raised by said elevating device to form a stack; and
    means for driving said conveyer to move said handling racks out of said stack onto said track means and through said field to subject said articles to said field to attract said articles and suspend the articles along the lines of force.

5. In an apparatus for transferring a plurality of elongated, paramagnetic articles from handling racks to a scoop;
    a feeding canister for holding a stack of handling racks;
    an endless conveyer mounted for movement into and out of said feeding canister and having a plurality of spaced pawls for engaging successive racks;
    a receiving canister having a slotted opening for receiving said handling racks;
    a trackway extending from said conveyer to said receiving canister;
    a pair of magnets on opposite sides of said trackway spaced apart a distance slightly greater than the length of the articles for establishing a magnetic field having parallel, horizontal lines of force spanning said trackway and for receiving said scoop therebetween;
    a pair of retaining pawls on opposite sides of said receiving canister for holding said handling racks in said canister;
    means for urging said pawls into said receiving canister and under said racks to hold said racks in said receiving canister;
    an elevating device for raising each leading handling rack off said trackway and over said retaining pawls; and
    means for driving said conveyer to move said handling racks out of said stack onto said trackway and through said magnetic field whereupon said articles are attracted from said handling racks and suspended in said field for subsequent removal in said scoop.

References Cited

UNITED STATES PATENTS 3,209,514  10/1965  Schmermund.
3,388,795  6/1968   Beroset _____ 209—73
3,429,466  2/1969   Puderbach.

GERALD M. FORLENZA, Primary Examiner

G. F. ABRAHAM, Assistant Examiner

U.S. Cl. X.R.

214—8.5, 309